United States Patent [19]

Mansfield

[11] Patent Number: 4,996,919
[45] Date of Patent: Mar. 5, 1991

[54] BI-METAL FEED SCREW FOR SCREW PRESSES

[75] Inventor: Peter W. Mansfield, Holmes Beach, Fla.

[73] Assignee: The Dupps Company, Germantown, Ohio

[21] Appl. No.: 411,191

[22] Filed: Oct. 19, 1989

Related U.S. Application Data

[63] Continuation of Ser. No. 191,200, May 6, 1988, abandoned.

[51] Int. Cl.⁵ .................................................. B30B 3/00
[52] U.S. Cl. ..................................... 100/145; 100/117; 366/322; 425/208
[58] Field of Search ................ 100/117, 145, 146, 147, 100/148, 149, 150; 425/207, 208, 209, 175; 164/94, 95, 98; 198/676; 366/322, 79, 90, 318, 324

[56] References Cited

U.S. PATENT DOCUMENTS

| 215,210 | 5/1879 | Coventry | 164/95 |
|---|---|---|---|
| 3,034,424 | 5/1962 | Zies | 100/145 |
| 3,156,589 | 11/1964 | Klement | 164/95 X |
| 3,592,128 | 7/1971 | French | 100/145 |
| 3,721,184 | 3/1973 | French et al. | 100/117 |
| 3,894,325 | 7/1975 | Maruta et al. | 164/95 X |
| 3,980,013 | 9/1976 | Bredeson | 100/117 |
| 3,998,318 | 12/1976 | McAlarney | 425/208 X |
| 4,223,601 | 9/1980 | Knuth et al. | 100/117 |
| 4,364,664 | 12/1982 | Theysohn | 100/146 X |
| 4,440,076 | 4/1984 | Mansfield | 100/117 |
| 4,644,861 | 2/1987 | Mansfield | 100/145 X |
| 4,838,700 | 6/1989 | Williamson | 100/145 X |

FOREIGN PATENT DOCUMENTS

| 69263 | 7/1915 | Austria | 198/676 |
|---|---|---|---|
| 3006101 | 8/1981 | Fed. Rep. of Germany | 198/676 |
| 557425 | 2/1957 | Italy | 100/145 |
| 310680 | 5/1929 | United Kingdom | 100/145 |
| 592834 | 9/1947 | United Kingdom | 100/145 |

Primary Examiner—Timothy F. Simone
Assistant Examiner—Stephen F. Gerrity
Attorney, Agent, or Firm—Charles J. Prescott

[57] ABSTRACT

A cast-formed bi-metallic worm in a mechanical screw press for expressing liquids from fibrous materials and a method of manufacture thereof. The worm is rotatably driven by the presses drive shaft and includes a body adapted to slidably engage around and be driven by the drive shaft and a flight extending radially outward from within the body. The body is formed of a ductal homogeneous cast material while the flight, which may be continuous or split, is cast formed of a harder homogeneous material so as to mechanically engage within and be rotatably driven by the body. The worm may also include a wear resistant cast-formed shell around the periphery of the body formed of either the same material as the flight or another hard wear resistant material.

4 Claims, 3 Drawing Sheets

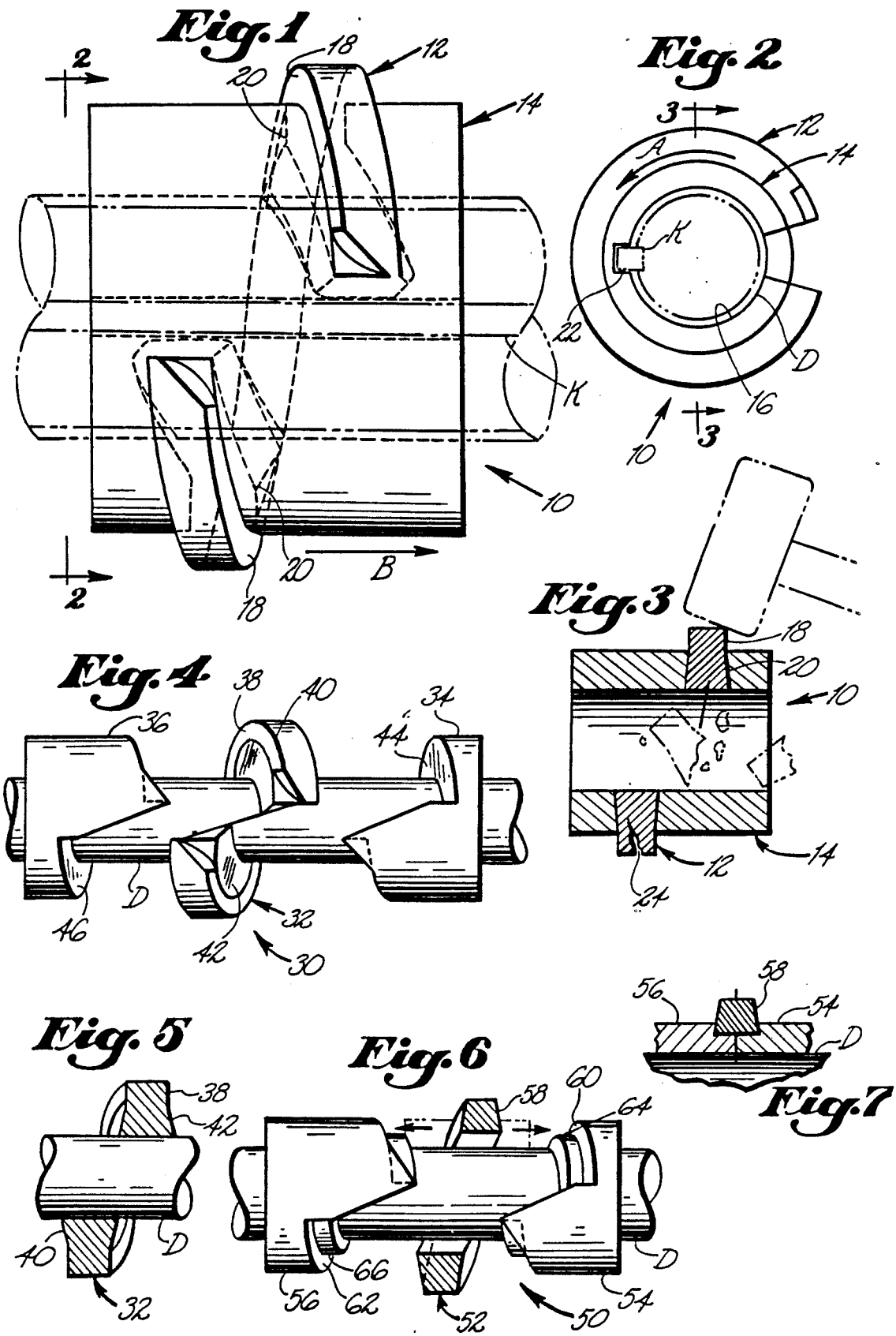

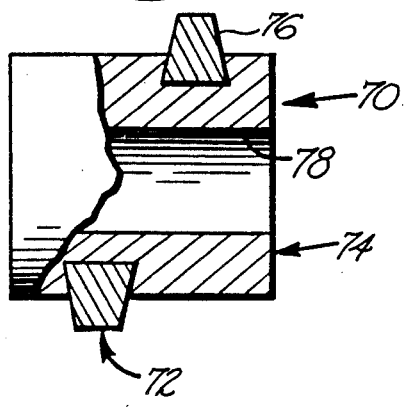
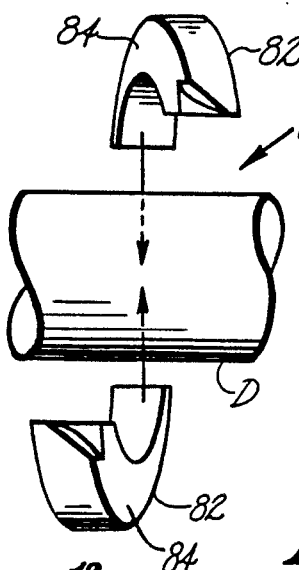
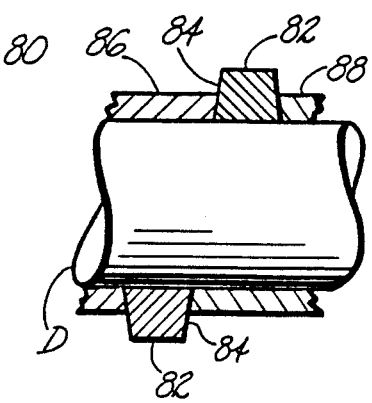
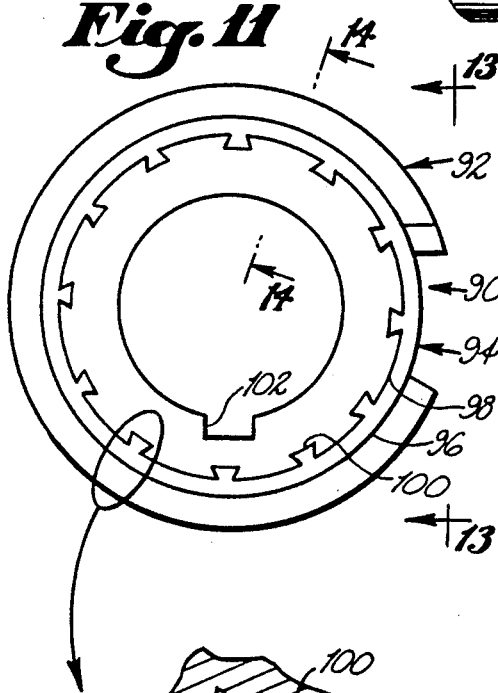
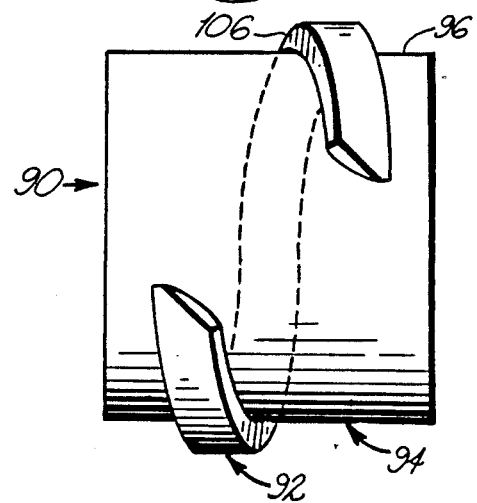
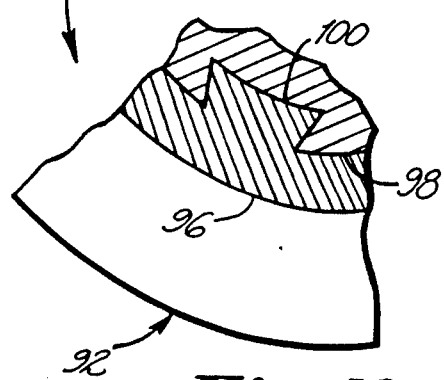
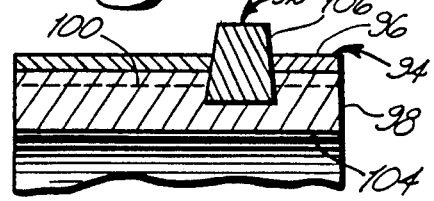

BI-METAL FEED SCREW FOR SCREW PRESSES

This is a continuation of co-pending application Ser. No. 191,200 filed on May 6, 1988 and now abandoned.

BACKGROUND

This invention relates generally to screw presses for expressing fluids from fibrous materials, and more particularly to a bi-metallic feed screw or worm for use in conjunction with screw presses.

The worm flights which radially extend from the worm of feed screws of high pressure expressing presses incur substantial wear and abusive interaction with both the fibrous material and debris contained therein as it interacts with the walls of the screw press. It is a well-known technique to provide wear resistant or hard-facing coatings upon the surfaces of the worm flight which are subjected to highest wear. Techniques utilized for this purpose are deposit welding, flame spray deposition, plasma deposition and the like. Thereafter, the surfaces are smoothed manually back to the desired dimension of the flight. These conventional deposit welding techniques are labor intensive, require expensive components, and provide poor bonding between the ductile base material and the harder deposit weld material.

An effort to resolve this wear problem is disclosed in U.S. Pat. No. 3,592,128 to French which teaches the addition of hardened insert members removably connected to the forwardly facing surface of each worm flight. Another effort to resolve peripheral wear is disclosed in U.S. Pat. No. 4,223,601 to Knuth et al. which discloses a worm flight formed with an outwardly opening groove which is filled by deposit welding with a harder metal than that of the flight. Yet another effort to resolve the peripheral worm flight wear problems is disclosed in my earlier U.S. Pat. No. 4,440,076 wherein a plurality of hardened inserts are embedded in a row outwardly extending at the periphery of the worm flight.

Several attempts have also been made to produce a homogeneous feed screw by utilizing casting techniques. However, if a highly wear resistant, brittle material is chosen, cracking at the key way or other overall highly stressed areas occurs. Alternatively, where a more ductile material is used, premature wear of the flight is experienced.

The present invention provides an optimal utilization of both ductile and brittle casting material by providing a bi-metallic structure rigidly interconnected to form a worm flight of brittle material and a worm body or collar of more ductile material. Various embodiments and methods of manufacture are also provided utilizing casting techniques.

BRIEF SUMMARY OF THE INVENTION

This invention is directed to a cast-formed bi-metallic worm in a mechanical screw press for expressing liquids from fibrous materials and a method of manufacture thereof. The worm is rotatably driven by the press drive shaft and includes a body adapted to slidably engage around and be driven by the drive shaft and a flight extending radially outward from within the body. The body is formed of a ductile homogeneous cast material while the flight, which may be continuous or split, is cast formed of a harder homogeneous material so as to mechanically engage within and be rotatably driven by the body. The worm may also include a wear resistant cast-formed shell around the periphery of the body formed of either the same material as the flight or another hard wear resistant material.

It is therefore an object of this invention to provide a bimetallic worm for screw presses which is fabricated by conventional casting techniques having a flight formed of harder wear resistant material and a body formed of more ductile, softer and tougher material.

It is another object of this invention to provide a bi-metallic worm for screw presses which is reliant only upon mechanical design rather than chemical bonding for strength and rigidity.

It is another object of this invention to provide a harder, wear resistant shell mechanically bonded around the body of the worm.

It is yet another object of this invention to provide a method of manufacturing a bi-metallic worm for screw presses.

In accordance with these and other objects which will become apparent hereinafter, the instant invention will now be described with reference to the accompanying drawings in which:

BRIEF DESCRIPTION OF THE DRAWINGS

FIG. 1 is a side elevation view of the preferred embodiment of the invention.

FIG. 2 is a reduced scale view in the direction of arrows 2—2 in FIG. 1.

FIG. 3 is a section view in the direction of arrows 3—3 in FIG. 2 depicting the break away feature of the worm flight during replacement.

FIG. 4 is a side elevation exploded view of another embodiment of the invention.

FIG. 5 is a side elevation centerline section view of the worm flight of FIG. 4.

FIG. 6 is a side elevation exploded partial centerline section view of yet another embodiment of the invention.

FIG. 7 is a side elevation centerline section view of the upper portion of the worm flight and the locking adjacent collars of FIG. 6.

FIG. 8 is a side elevation partial centerline section view of an alternate embodiment of FIG. 6.

FIG. 9 is an exploded side elevation view of another embodiment of the worm flight.

FIG. 10 is a side elevation centerline section view of the embodiment of the invention shown in FIG. 9.

FIG. 11 is an end elevation view of another embodiment of the invention having wear resistant outer surfaces there engaged about the collar.

FIG. 12 is an enlarged partial section view of one segment of FIG. 11.

FIG. 13 is a view in the direction of arrows 13—13 in FIG. 11.

FIG. 14 is a section view in the direction of arrows 14—14 in FIG. 11.

DETAILED DESCRIPTION OF THE INVENTION

Figure 15:
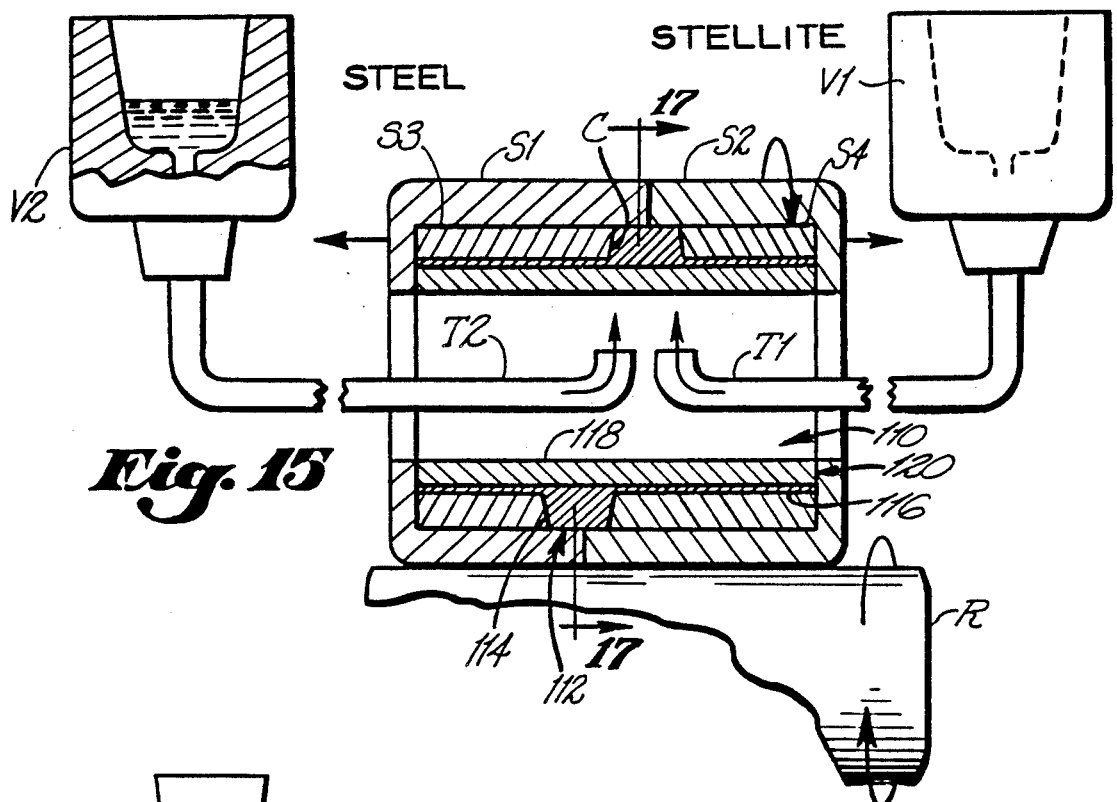
FIG. 15 is a side elevation centerline partial section view of yet another embodiment of the invention and depicting one method of manufacture.

Referring now to the drawings, and particularly to FIGS. 1-3, the preferred embodiment of the worm is shown generally at 10 and includes a main cylindrical body 14 and radially outwardly extending flight 12. The body 14 is cast formed by conventional rotational or stationary casting techniques of a ductile, relatively tough material, while the flight 12 is cast formed in place within worm 14 of a more brittle, harder high cobalt or chrome steel material such as STELLITE. To accomplish this in situ casting process of the flight 12, a circular cylindrical insert which is of a diameter equal to that of the drive shaft D is placed axially through the center of body 14 while a properly shaped mold is placed around the periphery to duplicate the desired shape of flight 12. Thereafter, either well-known casting process may be employed.

To insure that the flight 12 is retained rigidly within body 12, the portion of the flight sidewalls 20 which are within the body 14 are outwardly tapered as shown while the exposed sidewalls of flight 12 are generally parallel as desired for expressing the fibrous materials. The inner surface of flight 12, pressing against and being supported by the drive shaft D of the screw press prevents the flight 12 from inward movement while mounted around the drive shaft and in use. Because of the helical configuration of each flight 12 and mating engagement within the body 14 as shown, the rotational driving effort provided by drive shaft D, transferred to body 14 by key K, need not be also transferred directly into flight 12 via key K. Therefore a clearance 22 is provided between key K and the flight 12 so that no undue stress is placed on the more brittle STELLITE material resulting in premature cracking of the flight 12.

Referring particularly to FIG. 3, when a flight 12 has incurred damage e.g. at 24, by removing the worm 10 from the drive shaft D of the screw press, a large mallot M may be utilized to inwardly break away the brittle flight material 12 so that the body 14 may be reused by recasting another flight 12 in place.

Referring now to FIGS. 4 and 5, another embodiment of the invention is shown generally at 30 including a one piece flight 32 cast formed of a brittle, hard material, and a matching pair of body portions 34 and 36 which, slide together against either side of flight 32 wherein surfaces 44 and 46 of body portions 34 and 36 mate against surfaces 40 and 42 of flight 32. Adjacent components of the feed screw mounted on drive shaft D (not shown) serve to maintain mateable interengagement between flight 32 and the adjacent body portions 34 and 36 so that rotational driving effort provided by drive shaft D into the body portions 34 and 36 (typically by a key not shown) then rotatably drive flight 32.

The embodiment shown in FIGS. 4 and 5 is, again, formed of cast components wherein the flight 32 is cast formed of a more brittle STELLITE type material, while the body portions 34 and 36 are cast formed of a more ductile, tough material such as modular cast steel. It should be noted that, in this embodiment 30, the exposed walls 38 of flight 32 may be parallel for proper function, while the concealed wall portions 40 and 42 are inwardly tapered for supportive engagement against and between surfaces 44 and 46. Further, flight 32 inwardly extends to mate against and be radially supported by the outer surface of the drive shaft D.

Referring now to FIGS. 6 and 7, an embodiment similar to that described in FIG. 4 is shown generally at 50 having flight 52 and body portions 54 and 56. However, in this embodiment 50, flight 52 includes tapered walls 58 which do not extend to the drive shaft. Rather, in this embodiment 50, body portions 54 and 56 include collar portions 64 and 66 which mate between drive shaft D and the inner circular surface of flight 52 while surfaces 60 and 62 mate against tapered walls 58 to support and retain flight 52 in place. Again, the helical configuration of flight 52 and its distal ends provide the driving surface which mateably engages against the mating contours of body portions 54 and 56 to rotatably drive the flight 52.

Referring now to FIG. 8, a variation of the embodiments of the inventions shown in FIGS. 1 and 6 is shown generally at 70. In this embodiment, a one-piece flight 72 cast formed of brittle material within a suitably prepared cavity in body 74 is there shown. Flight 72, having tapered side walls 76 for strength and mechanical interengagement within body 74, extends toward but does not go entirely through the thickness of body 74 to the longitudinal cylindrical hole 78 provided to receive the drive shaft (not shown).

It should be here noted that, although the preferred sequence of forming the worm 70 is to first cast form the body 74 and, thereafter to cast form the flight 72 of a harder, brittle material, utilizing the cavity preformed into body 74 and a suitable periphery mold, the alternate sequence may also be utilized. That sequence would include initial cast forming of the flight 72 of the harder STELLITE-type material and, thereafter utilizing the flight as part of the mold, the body 74 would then be cast formed supported and formed by suitable surrounding cylindrical inner and outer molds. As with all embodiments, the flight 76 is mechanically trapped and supported within the body 74.

Referring now to FIGS. 9 and 10, yet another embodiment of the invention is shown generally at 80 being substantially similar to the embodiment shown in FIG. 1, except that the side walls 84 are continuously tapered and the flight, is formed of two identical flight portions 82. This embodiment 80, as previously described with respect to FIG. 1, includes a two-piece body 86 and 88 which mateably adapts and is rotatably driven by drive shaft D. The body portions 86 and 88 are formed of a more ductile, tough material, while the flight portion 82 is cast formed of a more brittle, wear-resistant material. The benefit provided by this embodiment 80 is that the body portions 86 and 88, which slidably engage and are securely retained against tapered side walls 84 may be slid apart on drive shaft D to allow the flight portions 82 to be conveniently removed for replacement without removal of the body portions 86 and 88 from the drive shaft.

Referring now to FIGS. 11 to 14, another embodiment of the invention is shown generally at 90 and is similar in structure to FIG. 1 with the addition of an in-place cast formed shell 96 around the cylindrical periphery of body 94. A one piece cast formed flight 92, having tapered side walls 106, is mechanically engaged within body 94, extending radially thereinto but not fully through to the inner longitudinal aperture 104 which receives the drive shaft (not shown).

The outer shell 96 is cast formed in place of a more brittle, wear resistant material, being mechanically engaged around and within the inner main body portion 98 by tabs 100 which extend radially around the length of shell 96 as shown.

By this arrangement then, the flight 92, as well as the exposed shell 96 of body 94 are formed of brittle, more wear resistant cast materials which may be dissimilar in composition, while the main body portion 98 is cast formed of a more ductile, tougher material for driving engagement at keyway 102 with the drive shaft of the screw press (not shown).

Figure 16:
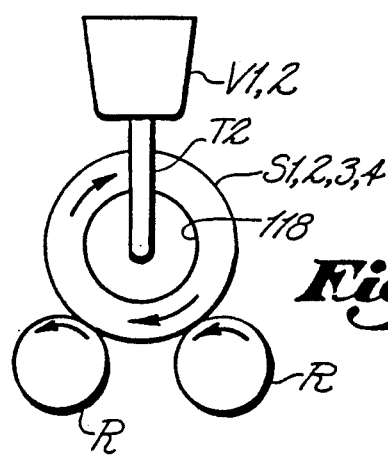
FIG. 16 is a left end elevation view of FIG. 15.
Figure 17:
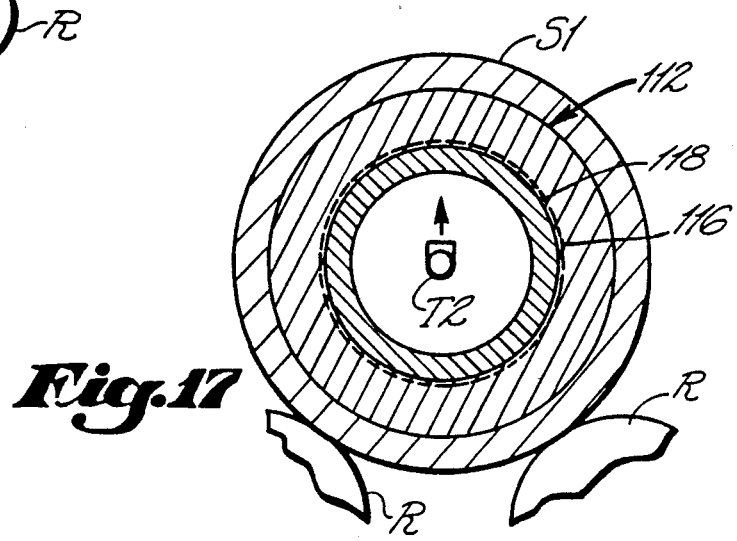
FIG. 17 is a section view in the direction of arrows 17—17 in FIG. 15.

Referring lastly to FIGS. 15 to 17, a system and method of cast forming one embodiment of the invention shown at 110 is there shown. This embodiment of worm 110 includes flight 112 cast formed of a rigid STELLITE material which extends radially inward to form the outer surface 116 of body 120 for improved wear resistance. The inner main portion 118 of body 120 is formed of a second, softer and more ductile material for toughness and strength.

METHOD OF MANUFACTURE

The method of manufacture disclosed embodies conventional centrifugal cast forming techniques. A two-part outer sleeve S1/S2 having inwardly extending ends entraps and supports a two-part inner sleeve S3/S4. However, the two-part inner sleeve S3/S4 is separated to form the helical cavity C. As this entire assembly of inner and outer sleeves is rotated on rollers R, a first molten metal, preferably STELLITE, is deposited by tube T1 from vat V1. A sufficient quantity of molten STELLITE is deposited thusly so as to fill cavity C and to extend a small distance radially inwardly to form outer shell 116.

Where the second molten cast material, a more ductile tough material which may be advantageously chemically adhered to the somewhat molten STELLITE, a quantity of the molten material such as nodular steel or iron from vat V2 is deposited by tube T2 into the rotating mold. A sufficient quantity of the second material is deposited so as to extend main body portion 118 radially inwardly slightly smaller than the diameter of the drive shaft (not shown) of the screw press. The entire bi-metallic cast worm 110 is allowed to cool and harden, whereupon outer shell portions S1 and S2 are moved apart in the direction of the arrows, inner sleeves S3 and S4 are likewise moved apart longitudinally in the direction of the arrows and the resulting worm 110 is fully formed ready for finish machining of the inner bore with required key ways to equal the outer diameter of the drive shaft and key of the screw press (not shown).

It is here noted that the above-described method may be utilized to form any of the embodiments previously described, including that embodiment shown in FIG. 11 which includes the outer shell 96 cast formed of brittle STELLITE and mechanically engaged by tabs 100 into the more ductile main body portion 98.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A cast-formed bi-metallic worm in a mechanical screw press having a rotary drive shaft in driving engagement with said worm, the screw press for use in expressing fibrous materials, said worm comprising:
   a body having a generally cylindrical outer surface and structured to slidably engage around an in drivable communication with the drive shaft, said body formed of a first rigid, homogeneous material;
   a helical flight having side walls which extend radially from an inner point radially inward from said body outer surface but not to the drive shaft to an outer point radially outward from said body outer surface and structured to be mechanically locked in direct contact within and be rotatably driven by said body, said flight formed of a second rigid homogeneous material harder than said first material;
   said flight side walls generally convergingly tapered radially outwardly from said inner point to at least said outer surface for enhanced mechanical engagement of said flight within said body;
   said flight segmented into at least tow flight portions forming a continuous flight to facilitate removal of said flight from said body for replacement.

2. A cast-formed bi-metallic worm as set forth in claim 1, wherein:
   said body is segmented into two portions each adapted to slidably engage around the drive shaft;
   each said body portion adapted to mate against one side of said flight.

3. A cast-formed bi-metallic worm in a mechanical screw press having a rotary drive shaft in driving engagement with said worm, the screw press for use in expressing fibrous materials, said worm comprising:
   a body having a generally cylindrical outer surface and structured to slidably engage around and in drivable communication with the drive shaft, said body formed of a first rigid, homogeneous material;
   a helical flight having side walls which extend radially from an inner point radially inward from said body outer surface but not to the drive shaft to an outer point radially outward from said body outer surface and structured to be mechanically locked in direct contact within and be rotatably driven by said body, said flight formed of a second rigid homogeneous material harder than said first material;
   said flight side walls generally convergingly tapered radially outwardly from said inner point to at least said outer surface for enhanced mechanical engagement of said flight within said body;
   an outer shell extending around the periphery of said body structured to mechanically engage with said body periphery;
   said outer shell formed of a third homogeneous material harder than said first material.

4. A cast-formed bi-metallic worm as set forth in claim 3, wherein:
   said flight and said outer shell and said second and said third materials are homogeneous.

* * * * *

UNITED STATES PATENT AND TRADEMARK OFFICE
CERTIFICATE OF CORRECTION

PATENT NO. : 4,996,919
DATED : March 5, 1991
INVENTOR(S) : Peter W. Mansfield

It is certified that error appears in the above-identified patent and that said Letters Patent is hereby corrected as shown below:

Column 6, Line 21, rewrite "tow" as -- two --.

Signed and Sealed this

Seventh Day of July, 1992

Attest:

DOUGLAS B. COMER

*Attesting Officer*   *Acting Commissioner of Patents and Trademarks*